United States Patent Office 2,803,605
Patented Aug. 20, 1957

2,803,605

BRAKE FLUID

George L. Doelling and Chester B. Swander, St. Louis, Mo., assignors to Wagner Electric Corporation, St. Louis, Mo., a corporation of Delaware No Drawing. Application May 12, 1954,
Serial No. 429,390

8 Claims. (Cl. 252—79)

This invention relates to fluids for use in pressure systems. More particularly it relates to hydraulic brake fluids, especially to brake fluids usable at extremely low temperatures as well as at temperatures usually encountered in the operation of automobiles, buses, trucks or military vehicles.

This application is a continuation-in-part of our copending application Serial No. 303,617, filed August 9, 1952, entitled "Brake Fluid," and now abandoned.

The principal object of the present invention is to provide suitable fluids for actuating hydraulic brakes and other pressure systems on automobiles, trucks, buses, military vehicles and wherever hydraulic brakes are used, including so-called industrial brakes such as crane brakes, etc.

Another object of this invention is to provide hydraulic brake fluids which will operate satisfactorily even under severe conditions of operation. Many of the brake fluids used in passenger cars in the past are not suitable or safe for heavy-duty use in trucks, buses and military vehicles or under severe conditions of temperature or climate. Another object is to provide a more economical brake fluid which meets heavy-duty requirements.

The new brake fluids of this invention are characterized by the property of being operative at extremely low winter temperatures, such as is required in military vehicles in northern climates, as well as in summer weather in milder climates, and under heavy-duty conditions.

This invention comprises hydraulic brake fluids having ingredients and combinations of ingredients, the proportions thereof, and features of composition and synthesis, which will be hereinafter described and claimed.

The generally accepted requirements of a satisfactory hydraulic brake fluid are as follows:

It must be sufficiently high in boiling point so that it does not vaporize while in use in the system. It must not freeze or solidify even at extremely low winter temperatures. Its viscosity at low temperatures must not be over about 2200 centistokes at the lowest temperature encountered in use. It must not corrode metals or have a swelling or deleterious effect on rubber sealing elements. Also, good lubricating value, water-tolerance, stability under heat, and miscibility with other brake fluids, are required.

One difficulty with brake fluids to date has been that if a sufficient amount of lubricant, such as castor oil or ricinoleate ester, was used to give good lubricating value, then the fluid would have inferior low-temperature properties, a high viscosity or actually would freeze up at low winter temperatures. Since certain specifications for brake fluids now require at least 15 or 20% by weight of non-volatile lubricant element, such as castor oil, it is difficult to meet this requirement and also meet the ever-increasing requirement for low freezing point and low viscosity at low temperatures.

To meet these requirements, and also the requirement that the lubricant element of the brake fluid should not be soluble in water, we have found that if as the lubricant element of a brake fluid, part of the lubricant is a glycol ricinoleate and part of it is an insoluble polypropylene glycol, then all of these requirements are met.

The brake fluid of this invention contains as the water-insoluble lubricant element a mixture of a ricinoleate of an aliphatic glycol and a water-insoluble polypropylene glycol, having an average molecular weight of 1,000 to 3,000. As the diluent element this fluid contains a diluent selected from the group consisting of the propyl alcohols, the butyl alcohols, the amyl alcohols, methoxybutanol, and the lower mono-alkyl ethers of ethylene glycol and diethylene glycol. The diluent may include a substantial portion of an alcohol having the formula $C_6H_{13}OH$, preferably methyl isobutyl carbinol sometimes referred to simply as MIBC. In addition, a relatively smaller amount of one or more glycols such as propylene, butylene or hexylene glycol, and a corrosion inhibitor and an anti-oxidant may be used.

Our preferred composition comprises from 5 to 20% by volume of a ricinoleate of a glycol, said glycol being an aliphatic glycol having not over five carbon atoms per molecule, from 5% to 20% by volume of a water-insoluble polypropylene glycol having an average molecular weight from 1,000 to 3,000, from 50% to 75% by volume of at least one diluent chosen from the group consisting of the propyl alcohols, the butyl alcohols, the amyl alcohols, methoxy-butanol, and the lower mono-alkyl ethers of ethylene and diethylene glycol, from 5% to 25% by volume of at least one glycol chosen from the group consisting of propylene glycol, butylene glycol, and hexylene glycol, together with a corrosion inhibitor and an antioxidant if so desired. Another preferred composition includes 15% to 25% by volume of methyl isobutyl carbinol, preferably about 21%, as part of the diluent.

This composition makes it possible to meet the stringent requirements of a so-called "Arctic" fluid and still have in it a considerable amount of the castor-base type of lubricant which gives good lubricating and corrosion-resisting properties to the fluid. This has not been previously accomplished because the castor-base lubricants, where used alone, do not give a fluid which will meet the rigid freezing point and low-temperature water-tolerance tests specified for such "Arctic" fluids. This novel composition also makes it possible to produce brake fluids in quantity even when the supply of castor oil is limited, as is often the case, especially in time of war. In the lubricant element of the fluid, the ricinoleates of the lower aliphatic glycols and di-glycols are preferred since they are stable, give good lubricating qualities to the fluid, and do not cause the fluid to congeal or freeze up at low temperatures as readily as does castor oil for example. Propylene glycol mono-ricinoleate is the preferred ricinoleate ester in this composition. Di-ethylene glycol ricinoleate and butylene glycol ricinoleate can also be used. A substantially water-insoluble polypropylene glycol having an average molecular weight of from 1,000 to 3,000 is also used in the lubricant element of the fluid. The preferred polypropylene glycol is of an average molecular weight of about 2,000. This product has a viscosity somewhat lower than castor oil, about 700 seconds Saybolt at 100° F., against about 1,390 for castor oil. Like castor oil its swelling action on rubber is very slight.

The diluent or viscosity-reducing agent in our preferred fluid may be an alcohol such as normal-butanol or isobutanol, a glycol-ether such as 3-methoxybutanol or diethylene glycol mono-ethyl ether or other lower alkyl ether of ethylene or diethylene glycol. When the diluent is diethylene glycol mono-ethyl ether, the pure, so-called low-gravity grade should be used, since the commercial product may contain as much as 20% or more of ethylene glycol, which is not suitable for use in this composition. It has also been found that the addition of methyl isobutyl carbinol (MIBC) as a portion of the diluent element of the fluid gives unexpectedly good results. Methyl isobutyl carbinol is a hexanol and is a relatively inexpensive diluent.

To prevent attack on the metal parts of the brake system a corrosion inhibitor may be used. Potassium ricinoleate, borax, sodium nitrite or diamylamine phosphate may be used, as well as an antioxidant such as diphenylol propane or hydroquinone or 2,6-di-tertiary-butyl 4-methyl phenol. Usually about 0.2 to 3.0% of the corrosion inhibitor and from 0.1 to 0.5% of the antioxidant, on the weight of the fluid is sufficient for the purpose.

The proportions of the ingredients used in applicants' composition are critical, and the proportions claimed are chosen because all of the numerous requirements of a commercially practicable brake fluid will not be satisfactorily met unless these proportions are used.

More specifically, the following examples will serve to illustrate the invention. These examples, which are illustrative of the various ratios or proportions, produce approximately 100 cc. of fluid.

*Example No. 1*

| | |
|---|---|
| Diethylene glycol mono-ethyl ether_____cc__ | 65 |
| Polypropylene glycol (mol. wt. 2,000)_____cc__ | 11.5 |
| 2-methyl-2,4-pentanediol _____cc__ | 5.0 |
| Propylene glycol_____cc__ | 5.0 |
| Propylene glycol mono-ricinoleate_____cc__ | 12.5 |
| Diphenylol propane_____grams__ | 0.3 |
| Potassium ricinoleate_____do__ | 0.7 |

The 2-methyl-2,4-pentanediol is sometimes called hexylene glycol.

The brake fluid made up of the above ingredients had the following properties:

| | |
|---|---|
| Specific gravity at 20°_____ | .9905 |
| Color, Parlin scale_____ | 3 |
| pH, electrometric_____ | 8.82 |
| Acid number_____ | .14 |
| Viscosity at 100° F_____centistokes__ | 8.2 |
| Viscosity at −40° F_____do__ | 810 |
| Flash point_____° F__ | 215 |
| Boiling point_____° F__ | 385 |
| Rubber-swelling at 70° C., gain in weight after 16 hours_____percent__ | 4.23 |
| Freezing point (6 hours at −60° F.)_____ | Fluid |

The corrosion test specified in the SAE hydraulic brake fluid specification was run on this fluid (5 days at 210° F.). The aluminum strip showed no loss in weight, the tinned iron, steel, cast iron and copper each lost about .02 milligram per square centimeter, and the brass strip lost .06 milligram per square centimeter. All of these results are far below the allowable loss given in the specification, which is 0.5 each for brass and copper, 0.7 for tin, steel and cast-iron and 0.2 for aluminum. The pH after the corrosion test was 7.6.

A stroking test according to the SAE specification was run on this fluid, and the results were satisfactory, indicating adequate lubricating properties in the fluid. Results after use of this brake fluid in test-cars also were satisfactory, showing that it is an operable hydraulic brake fluid.

*Example No. 2*

| | |
|---|---|
| Diethylene glycol mono-ethyl ether_____cc__ | 70.0 |
| Polypropylene glycol (mol. wt. 2,000)_____cc__ | 11.5 |
| Propylene glycol _____cc__ | 5.0 |
| Propylene glycol mono-ricinoleate_____cc__ | 12.5 |
| Diphenylol propane _____grams__ | 0.3 |
| Potassium ricinoleate_____do__ | 0.7 |

The brake fluid made by mixing these ingredients had the following properties:

| | |
|---|---|
| Specific gravity at 20° C_____ | .993 |
| Acid number _____ | 0.17 |
| Viscosity at −40° F_____centistokes__ | 680 |
| Viscosity at 68° F_____do____ | 13 |
| Boiling point, SAE _____° F__ | 381 |
| Cold test, 6 hours at 60° F_____ | Fluid |

The SAE corrosion test, 5 days at 210° F., on this fluid gave very satisfactory results. In every case, on tin, steel, aluminum, cast-iron, brass and copper, the loss in weight was less than 0.1 milligram per square centimeter, or far lower than the specification limit.

The rubber-swelling after 5 days at 70° C. on a 1¼ inch Manhattan cup was 4.95% by volume.

*Example No. 3*

| | |
|---|---|
| Diethylene glycol mono-ethyl ether_____cc__ | 60.0 |
| Polypropylene glycol (mol. wt. 2,000)_____cc__ | 7.5 |
| Propylene glycol _____cc__ | 4.2 |
| 2-methyl-2,4-pentanediol _____cc__ | 10.0 |
| Propylene glycol mono-ricinoleate_____cc__ | 17.0 |
| Diphenylol propane _____grams__ | 0.3 |
| Potassium ricinoleate_____do__ | 1.0 |

The brake fluid made by mixing these ingredients had the following properties:

| | |
|---|---|
| Specific gravity at 20° C_____ | .984 |
| Acid number _____ | 0.16 |
| Viscosity at 68° F_____centistokes__ | 14.8 |
| Rubber-swelling, 5 days at 70° C., gain in percent by volume _____percent__ | 4.7 |
| Boiling point _____° F__ | 379 |
| Cold test, 6 hours at −60° F_____ | Fluid |

The regular SAE corrosion test, 5 days at 210° F., on this fluid gave losses in milligrams per square centimeter as follows:

| | |
|---|---|
| Tinned iron _____ | .04 |
| Steel _____ | .17 |
| Aluminum _____ | .02 |
| Cast-iron _____ | .13 |
| Brass _____ | .12 |
| Copper _____ | .02 |

All of these are far below the specification limits.

*Example No. 4*

| | |
|---|---|
| 3-methoxybutanol-1 _____cc__ | 55.0 |
| Polypropylene glycol (mol. wt. 2,000)_____cc__ | 10.0 |
| Propylene glycol _____cc__ | 6.7 |
| 2-methyl-2,4-pentanediol _____cc__ | 10.0 |
| Propylene glycol mono-ricinoleate_____cc__ | 17.0 |
| Diphenylol propane _____gram__ | 0.3 |
| Potassium ricinoleate_____do__ | 1.0 |

The brake fluid made by mixing these ingredients had the following properties:

| | |
|---|---|
| Specific gravity at 20° C_____ | .951 |
| Boiling point _____° F__ | 320 |
| Viscosity at 68° F_____centistokes__ | 19 |
| Cold test, 6 hours at −60° F_____ | Fluid |
| Rubber swelling, 5 days at 70° C., gain in percent by volume _____percent__ | 4.5 |

*Example No. 5*

A so-called "Arctic" fluid was made up by mixing the following materials in the proportions given:

| | |
|---|---|
| Normal-butanol _____cc__ | 50.0 |
| Diethylene glycol mono-ethyl ether_____cc__ | 24.7 |
| Polypropylene glycol (mol. wt. 2,000)_____cc__ | 7.3 |
| Propylene glycol _____cc__ | 6.1 |
| 2-methyl-2,4-pentanediol _____cc__ | 3.0 |
| Propylene glycol mono-ricinoleate_____cc__ | 8.0 |
| 2,6-di-tertiary-butyl-4-methyl phenol _____gram__ | 0.1 |
| Potassium ricinoleate_____do__ | 0.5 |

The "Arctic" brake fluid made up of these ingredients had a boiling point of 266.4° F. The rubber swelling, 5 days at 70° C., on a standard 1¼ inch Manhattan cup equalled .037 inch gain in base diameter. In a cold test, after 6 days at −65° F., the fluid was substantially clear and readily fluid. The flash point (Cleveland Open) was 140° F. The specific gravity at 20° C. was .9031 and the pH (SAE method) was 9.1. After adding 5% by volume of water and then holding it at −65° F. for 24 hours, the composition was still readily fluid. This brake fluid is operative even at extremely low temperatures. After 6 hours at −90° F. it is still fluid.

*Example No. 6*

| | Cc. |
|---|---|
| Normal-butanol | 50.0 |
| Polypropylene glycol (mol. wt. 1200) | 19.0 |
| Propylene glycol | 9.0 |
| 2-methyl-2,4-pentanediol | 15.0 |
| Di-ethylene glycol mono-ricinoleate | 6.0 |
| Hydroquinone | 0.125 |
| Diamyl amine | 0.75 |
| Phosphoric acid (85%) | 0.125 |

The brake fluid made by mixing these ingredients had the following properties:

| | |
|---|---|
| Specific gravity at 20° C | .899. |
| Boiling point | 264.7° F. |
| Flash point (Cleveland Open) | 135° F. |
| Rubber-swelling, 16 hours at 70° C., Manhattan 1¼ inch cup, gain in weight | 2.82%. |
| pH, SAE method | 8.3. |
| Cold test (3 days at −40° F.) | Fluid, but viscosity is fairly high. |

*Example No. 7*

| | | |
|---|---|---|
| Isobutanol | cc | 60.0 |
| Polypropylene glycol (mol. wt. 2,725) | cc | 11.5 |
| Propylene glycol | cc | 5.0 |
| 2-methyl-2,4-pentanediol | cc | 10.0 |
| Propylene glycol mono-ricinoleate | cc | 12.5 |
| Diphenylol propane | grams | 0.3 |
| Potassium ricinoleate | do | 0.7 |

The brake fluid made by mixing these ingredients had the following properties:

| | |
|---|---|
| Specific gravity at 20° C | .876. |
| Color, Parlin scale | 2. |
| Flash point (Cleveland Open) | 115° F. |
| Boiling point | 237° F. |
| Acid number | .09 |
| pH, SAE method | 8.98. |
| Viscosity, SSU at 20° C | 100. |
| Cold test (3 days at −40° F.) | Readily fluid. |
| Rubber-swelling, 5 days at 70° C., gain in diameter on 1¼ inch cup | .037 inch. |

*Example No. 8*

| | | |
|---|---|---|
| Ethylene glycol mono-N-butyl ether | cc | 45 |
| Normal-propanol | cc | 15 |
| 1,3-butylene glycol | cc | 6.3 |
| Polypropylene glycol (mol. wt. 1025) | cc | 17.5 |
| 1,3-butylene glycol mono-ricinoleate | cc | 15.0 |
| Potassium ricinoleate | grams | 1.1 |
| 2,6 - di-tertiary-butyl-4-methyl phenol | do | 0.1 |

The brake fluid made by mixing these ingredients was tested with the following results:

| | |
|---|---|
| Specific gravity at 20°/20° C | .9287. |
| Flash point (Cleveland Open) | 135° F. |
| Boiling point, SAE | 251.4° F. |
| pH, SAE | 7.92. |
| Cold test, 16 hours at −50° | Readily fluid. |

*Example No. 9*

| | | |
|---|---|---|
| Methyl isobutyl carbinol | cc | 21.0 |
| Diethylene glycol mono-ethyl ether | cc | 39.2 |
| Polypropylene glycol (mol. wt. 2000) | cc | 9.0 |
| 2-methyl-2,4-pentanediol | cc | 12.0 |
| Propylene glycol | cc | 5.3 |
| Propylene glycol mono-ricinoleate | cc | 12.5 |
| Diphenylol propane | grams | 0.3 |
| Potassium ricinoleate | do | 0.7 |

The approximately 100 cubic centimeters of brake fluid made up of the above ingredients had the following properties:

| | | |
|---|---|---|
| Specific gravity at 20°/20° C | | .9470 |
| Color, Parlin scale | | 3 |
| pH, electrometric | | 9.28 |
| Acid number | | .064 |
| Viscosity at 100° F | centistokes | 8.4 |
| Viscosity at −40° F | do | 990 |
| Flash point, Cleveland | ° F | 155 |
| Boiling point, SAE method | ° F | 328 |
| Rubber-swelling, 5 days at 70° C., gain in base diameter | inches | .033 |
| Freezing test (6 hours at −60° F.) | | Fluid |

The corrosion-test specified in the SAE hydraulic brake fluid specification 70R1 was run on this fluid (5 days at 210° F.). The aluminum and tin strips showed no loss in weight; the steel, cast-iron and copper each lost only about .03 milligram per square cm., and the brass strip lost about .06 milligram per square cm. in weight during this test. The SAE pH on the fluid after the corrosion-test was 7.6. These test-results are easily within the SAE specification requirements.

A stroking test was run on this fluid according to the method given by the SAE brake fluid specification 70R1, to determine its lubricating value in a brake system. The results show that this fluid has satisfactory lubricating value. The wear on the aluminum master cylinder piston varied from .0001 to .0035 inch, and was polished in nature. No galling or rough wear occurred.

This fluid was tested in actual use in several test-cars over a considerable period of time, and has given good results, showing that it is an operable hydraulic brake fluid.

*Example No. 10*

| | | |
|---|---|---|
| Methyl isobutyl carbinol | cc | 24.5 |
| Diethylene glycol mono-ethyl ether | cc | 30.5 |
| Polypropylene glycol (mol. wt. 2000) | cc | 9.0 |
| 2-methyl-2,4-pentanediol | cc | 16.8 |
| Propylene glycol | cc | 5.3 |
| Propylene glycol mono-ricinoleate | cc | 12.5 |
| Tricresyl phosphate | cc | 0.4 |
| Diphenylol propane | grams | 0.3 |
| Potassium ricinoleate | do | 0.7 |

The approximately 100 cubic centimeters of brake fluid made up of this composition, had the following properties:

| | |
|---|---|
| Specific gravity at 20° C | .9378. |
| Flash point, Cleveland | 155° F. |
| Boiling point, SAE method | 322.5° F. |
| Freezing test, 6 hrs. at −60° F | Readily fluid. |
| Rubber-swelling, 5 days at 70° C | .035 inch. |

*Example No. 11*

| | | |
|---|---|---|
| 2-ethyl butyl alcohol | cc | 30.0 |
| Diethylene glycol mono-ethyl ether | cc | 30.2 |
| Polypropylene glycol (mol. wt. 2000) | cc | 9.0 |
| 2-methyl-2,4-pentanediol | cc | 12.0 |
| Propylene glycol | cc | 5.3 |
| Propylene glycol mono-ricinoleate | cc | 12.5 |
| Diphenylol propane | grams | 0.3 |
| Potassium ricinoleate | do | 0.7 |

The brake fluid made up of this composition, had the following properties:

Specific gravity at 20° C _____ .9388.
Boiling point, SAE method _____ 338.6° F.
Flash point, Cleveland _____ 165° F.
Viscosity at 68° F., Saybolt sec _____ 83.8.
pH, SAE method _____ 8.2
Freezing test (6 hours at −60° F.) _____ Readily fluid.
Rubber-swelling (5 days at 70° C.), gain in diameter of Manhattan 1¼ inch cup_ .042 inch.

The 2-methyl-2,4-pentanediol is sometimes called hexylene glycol.

The new and improved fluid of this application is a modification of the fluid described in application Serial No. 303,617. This new fluid has improved low-temperature properties and is made from readily available materials. Its boiling point and flash point are in the heavy-duty range. This fluid is characterized by the use of a hexanol, such as methyl isobutyl carbinol, in limited quantity, as a diluent, together with mono-ethyl ether of diethylene glycol. It is preferable to use from 15 to 25% of the hexanol in the fluid, and not over 35%, since too high a percentage of it gives excessive swelling of the rubber cups in the system. The mono-ethyl ether of diethylene glycol used in our fluid is the so-called "low-gravity" grade, sp. gr.=.989 to .993 at 20°/20° C.

What we claim is:

1. A hydraulic brake fluid comprising, per 100 parts by volume, from 15 to 35 parts by volume of a hexanol chosen from the group consisting of methyl isobutyl carbinol and 2-ethyl butyl alcohol, from 20 to 45 parts by volume of the mono-ethyl ether of diethylene glycol, from 5 to 20 parts by volume of propylene glycol mono-ricinoleate, from 5 to 20 parts by volume of a substantially water-insoluble polypropylene glycol having an average molecular weight between 1000 and 3000, from 5 to 25 parts by volume of at least one glycol chosen from the group consisting of propylene glycol and hexylene glycol, together with a small but effective amount of a corrosion-inhibitor.

2. A hydraulic brake fluid comprising, per 100 parts by volume, 15 to 35 parts by volume of methyl isobutyl carbinol, from 20 to 45 parts by volume of the mono-ethyl ether of diethylene glycol, from 5 to 20 parts by volume of propylene glycol mono-ricinoleate, from 5 to 20 parts by volume of a substantially water-insoluble polypropylene glycol having an average molecular weight between 1000 and 3000, from 5 to 25 parts by volume of at least one glycol chosen from the group consisting of propylene glycol and hexylene glycol, together with a small but effective amount of a corrosion-inhibitor.

3. A hydraulic brake fluid comprising, per 100 parts by volume, about 21 parts by volume of methyl isobutyl carbinol, about 39.2 parts by volume of mono-ethyl ether of diethylene glycol, about 9 parts by volume of polypropylene glycol having an average molecular weight of approximately 2000, about 12 parts by volume of hexylene glycol, about 5.3 parts by volume of propylene glycol, about 12.5 parts by volume of propylene glycol mono-ricinoleate, and a small but effective amount of a corrosion-inhibitor.

4. A hydraulic brake fluid comprising, per 100 parts by volume, about 21 parts by volume of methyl isobutyl carbinol, about 39.2 parts by volume of mono-ethyl ether of diethylene glycol, about 9 parts by volume of a substantially water-insoluble polypropylene glycol having an average molecular weight between 1000 and 3000, about 12 parts by volume of hexylene glycol, about 5.3 parts by volume of propylene glycol, about 12.5 parts by volume of propylene glycol mono-ricinoleate, and a small but effective amount of a corrosion-inhibitor.

5. A hydraulic brake fluid comprising, per 100 parts by volume, from 15 to 35 parts by volume of a hexanol chosen from the group consisting of methyl isobutyl carbinol and 2-ethyl butyl alcohol, from 20 to 45 parts by volume of the mono-ethyl ether of diethylene glycol, from 5 to 20 parts by volume of propylene glycol mono-ricinoleate, from 5 to 20 parts by volume of a substantially water-insoluble polypropylene glycol having an average molecular weight between 1000 and 3000, from 5 to 25 parts by volume of at least one glycol chosen from the group consisting of propylene glycol and hexylene glycol.

6. A hydraulic brake fluid comprising, per 100 parts by volume, 15 to 35 parts by volume of methyl isobutyl carbinol, from 20 to 45 parts by volume of the mono-ethyl ether of diethylene glycol, from 5 to 20 parts by volume of propylene glycol mono-ricinoleate, from 5 to 20 parts by volume of a substantially water-insoluble polypropylene glycol having an average molecular weight between 1000 and 3000, from 5 to 25 parts by volume of at least one glycol chosen from the group consisting of propylene glycol and hexylene glycol.

7. A hydraulic brake fluid comprising, per 100 parts by volume, 15 to 35 parts by volume of 2-ethyl butyl alcohol, from 20 to 45 parts by volume of the mono-ethyl ether of diethylene glycol, from 5 to 20 parts by volume of propylene glycol mono-ricinoleate, from 5 to 20 parts by volume of a substantially water-insoluble polypropylene glycol having an average molecular weight between 1000 and 3000, from 5 to 25 parts by volume of at least one glycol chosen from the group consisting of propylene glycol and hexylene glycol.

8. A hydraulic brake fluid comprising, per 100 parts by volume, 15 to 35 parts by volume of 2-ethyl butyl alcohol, from 20 to 45 parts by volume of the mono-ethyl ether of diethylene glycol, from 5 to 20 parts by volume of propylene glycol mono-ricinoleate, from 5 to 20 parts by volume of a substantially water-insoluble polypropylene glycol having an average molecular weight between 1000 and 3000, from 5 to 25 parts by volume of at least one glycol chosen from the group consisting of propylene glycol and hexylene glycol, together with a small but effective amount of a corrosion-inhibitor.

References Cited in the file of this patent

UNITED STATES PATENTS

| | | |
|---|---|---|
| 2,232,581 | Woodhouse et al. | Feb. 18, 1941 |
| 2,481,278 | Ballard et al. | Sept. 6, 1949 |
| 2,507,401 | Doelling | May 9, 1950 |
| 2,657,181 | Van Horn et al. | Oct. 27, 1953 |
| 2,665,312 | Ohlmann et al. | Jan. 5, 1954 |